United States Patent [19]

Noto et al.

[11] 4,268,999
[45] May 26, 1981

[54] AUTOMATIC POLISHING APPARATUS

[75] Inventors: Koichi Noto; Tsuneo Kawai, both of Yokohama, Japan

[73] Assignee: Hitachi, Ltd., Tokyo, Japan

[21] Appl. No.: 39,600

[22] Filed: May 16, 1979

[30] Foreign Application Priority Data

May 17, 1978 [JP] Japan .................................. 53-57657
Jun. 28, 1978 [JP] Japan ............................ 53-87962[U]

[51] Int. Cl.$^3$ ............................................ B24B 49/12
[52] U.S. Cl. ............................................ 51/165.72
[58] Field of Search ............ 51/56 R, 165.71, 165.72, 51/165.77, 400, 404

[56] References Cited

U.S. PATENT DOCUMENTS

| | | | |
|---|---|---|---|
| 2,499,178 | 2/1950 | Berry | 51/165.72 |
| 3,280,517 | 10/1966 | Copeland | 51/404 |
| 3,507,075 | 4/1970 | Schmidt | 51/165.72 |
| 3,939,610 | 2/1976 | Suzuki | 51/56 R |

*Primary Examiner*—Harold D. Whitehead
*Attorney, Agent, or Firm*—Craig & Antonelli

[57] ABSTRACT

An automatic polishing apparatus having in combination, a polishing machine for effecting the polishing and a profiling device for giving an instruction concerning the path along which the polishing is to be effected to the polishing machine. The profiling device has a tracer adapted to trace and profile a line which has been previously drawn in a drawing in accordance with the configuration of the surface to be ground, and detecting device adapted to detect the displacements of the tracer in the directions of X and Y-axes. The polishing machine includes a feeding arrangement adapted to feed one of a table carrying the article to be ground and a polishing head carrying the polishing tool relatively to the other in the directions of X and Y-axes, in accordance with signals representing the displacements in both directions of the tracer derived from the detecting device of the profiling device. The feed is made at a predetermined proportional ratio to the displacements of the tracer. A detector is carried by the polishing head and is adapted to detect the pressure applied to the polishing tool or a displacement caused by the pressure. A polishing arrangement is adapted to move one of the table and polishing head relatively to the other in the direction of Z-axis in accordance with the output from the detector so as to maintain the polishing tool in contact with the ground surface at a predetermined level of contact pressure to thereby effect a self-guided profiling polishing of the surface. The combination of the profiling device and the polishing machine permits an automatic polishing in accordance with the shape of the free curved surface to be polished.

15 Claims, 24 Drawing Figures

AUTOMATIC POLISHING APPARATUS

BACKGROUND OF THE INVENTION

The present invention relates to an automatic polishing apparatus for automatically polishing free curved surfaces such as the surfaces of molds.

The specification of U.S. Pat. No. 3,939,610 discloses an automatic polishing apparatus of self-guided constant pressure profiling type. This apparatus has a polishing tool carried by an arm which is adapted to be automatically swung to perform a profiling action in the Z-axis direction, i.e. in the depthwise direction. The control of the position of polishing tool on the surface to be ground as viewed in plan, i.e. in the plane defined by X and Y-axes, is achieved by making use of limit switches adjustably disposed along respective axes, in such a manner that the arm makes a constant-speed linear reciprocating movement the direction of which is changed as the limit switches are engaged by cams. Thus, the arm carrying the polishing tool is moved in accordance with the composite instruction which is obtained by composing the profiling instruction in Z-axis direction and the tabular movement instruction given by the limit switches.

This apparatus, however, can effectively be used only when the surface to be ground has a simple planar shape such as a rectangular shape, and cannot satisfactorily trace the complicated planar shape of the surface such as the surface of a plastic mold. This apparatus, therefore, cannot perform an efficient and good polishing and finishing of such a surface having a complicated planar shape.

To overcome above described problem, it is proposed to effect the control of tabular movement of the polishing tool in the plane defined by X and Y-axes, making use of a numerical control device. This method, however, requires strictly precise instructions for the positions of centers of arcs, points of intersections of locus and so forth, because the path of movement of the polishing tool is given as a combination of straight lines and arcs. Therefore, when the polishing tool is to be moved along a complicated path, the number of points of intersection are inevitably increased to require an impractically long time for the arithmetic operation or calculation of positions of these points. In addition, in the proposed control method employing an NC device, the actual polishing is performed after a tape check of an NC tape which is formed with these numerical data. The formation and check of the NC tape requires a considerably long time. This method, therefore, is quite unsuitable for the polishing of plastic molds which are usually produced one by one for each of different configurations of articles to be shaped by molding.

SUMMARY OF THE INVENTION

It is, therefore, an object of the invention to provide an automatic polishing apparatus capable of performing an automatic and efficient polishing, and profiling a surface including free curved surfaces, even when the surface has a complicated planar shape, by permitting a free setting of the path of movement of the polishing tool in accordance with the shape of the surface to be ground.

To this end, according to the invention, there is provided an automatic polishing apparatus having a profiling device including a tracer adapted to trace the lines of the path of movement of the grinding tool in the X-Y plane, the lines being freely drawn on, for example, a sheet of paper in accordance with the profile or shape of the surface to be ground. The X and Y components of the movement of the tracer are picked up as the control signals in accordance with which the polishing table is moved in X and Y directions to correctly reproduce or profile the movement of the tracer. On the other hand, the control of the tool position in the Z-axis direction, i.e. in the depthwise direction, is performed by a self-guided profiling system. Consequently, the surface is automatically polished by a combination of the tabular movement in X and Y directions and the depthwise movement in Z direction.

Particularly, it is to be noted that the lines of path of movement of the polishing tool can easily be drawn on a white paper by free hand by means of a pencil or with a black ink. The polishing tool position is automatically controlled even though the path of movement may be complicated, by simply placing the paper on the tracing device.

According to another aspect of the invention, the polishing head having a weight is moved reciprocatingly in X and Y directions, instead of the polishing table which carries a heavy article such as a mold, so as to ensure a higher precision of the polishing work.

According to still another aspect of the invention, the displacement of the polishing tool in Z direction is detected by a displacement detector, so as to permit a discrimination of the height of the portion of the curved surface under grinding. At the same time, the direction of reciprocating or oscillating movement of the polishing head is detected by means of limit switches or the like means. The rotational position of the article to be ground or the reciprocal or oscillatable polishing head as a whole is automatically controlled to uniformly finish the entire part of the curved surface, without being accompanied by the undesirable fluctuation of the polishing amount.

DESCRIPTION OF THE PREFERRED EMBODIMENT

A preferred embodiment of the invention will be described hereinunder with reference to the accompanying drawings.

Figure 1:
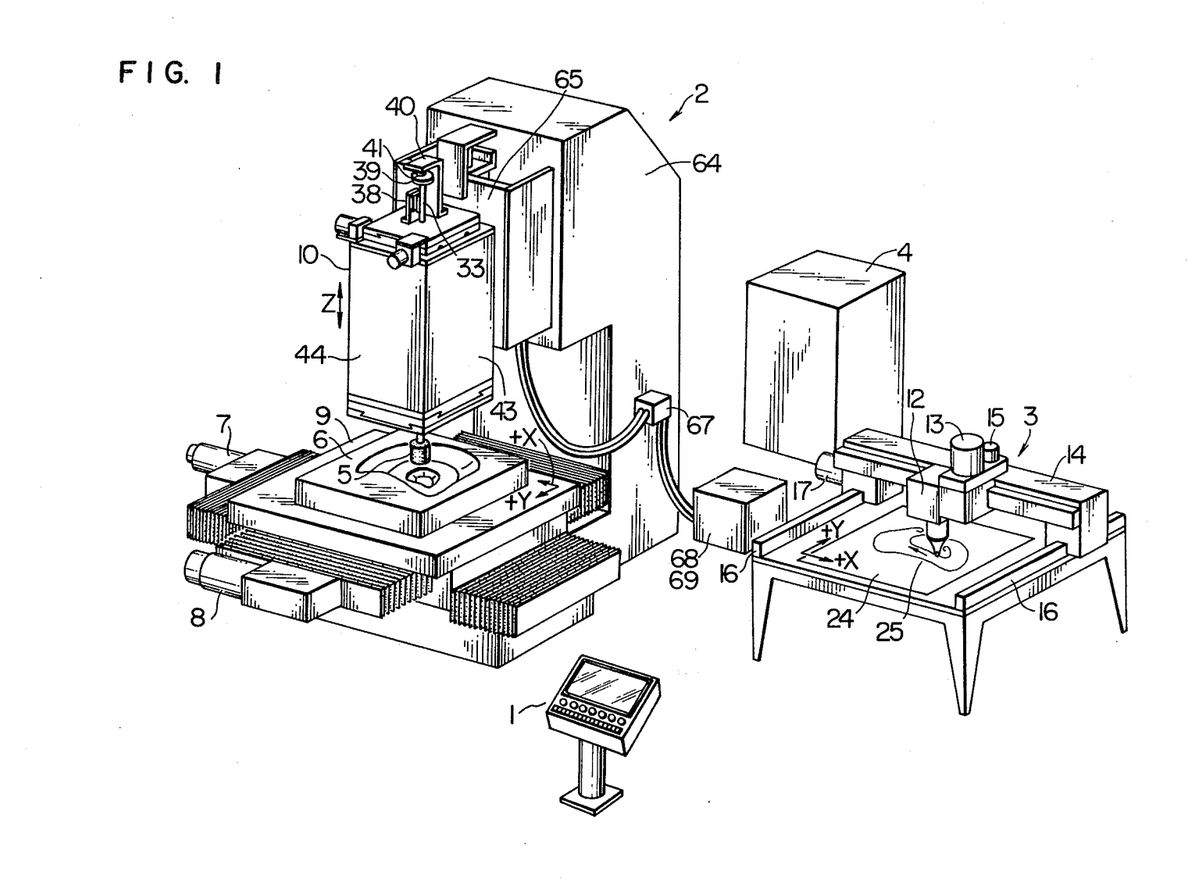
FIG. 1 is a schematic perspective view showing the appearance of an automatic polishing apparatus which is an embodiment of the invention.

Referring now to the drawings, and, more particularly, to FIG. 1, according to this figure, a polishing machine generally designated by the reference numeral 2, constituting the major part of the automatic polishing apparatus of the invention, is adapted to be controlled by means of a control stand 1. A reference numeral 3 generally designates an optical drawing profiling device which is adapted to be controlled by a controller 4.

The optical drawing profiling device 3 has a table 11 on which placed a paper carries a drawing 24 formed as a spiral, a figure or any other desired lines 25 drawn in accordance with the profile of the surface to be ground, by means of a pencil or with a black ink.

Figure 2:
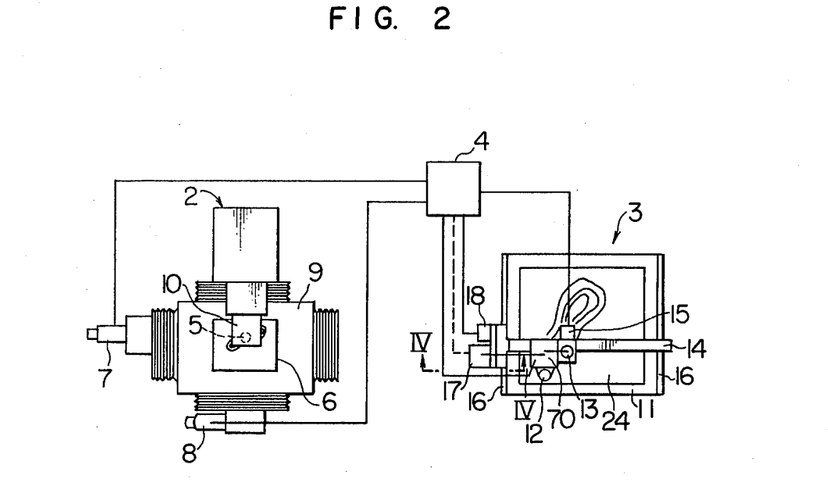
FIG. 2 is a plan view of the automatic polishing apparatus shown in FIG. 1.
Figure 3:
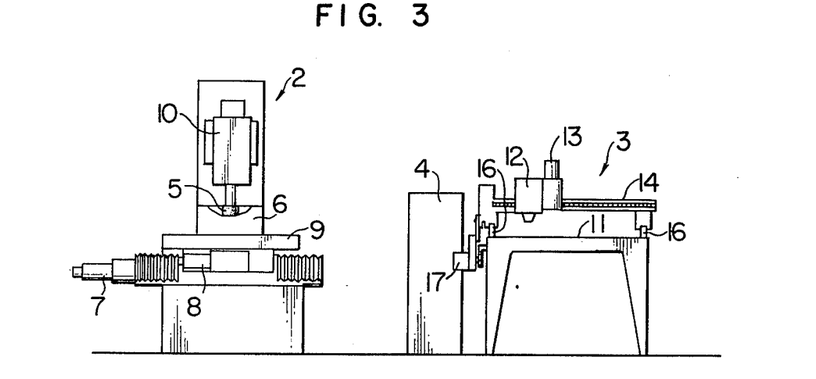
FIG. 3 is a front elevational view of the polishing apparatus as shown in FIG. 1.

An optical profiling head 12 includes a light source adapted to be supplied with electric power by the controller 4, a focussing lens adapted to focus the light into a spot and to apply the spot to the drawing 24, and a light receiving element adapted to receive the light reflected by the drawing 24. The optical profiling head 12 is adapted to be rotated by means of a motor in a controlling device 70 (FIG. 2) such that a predetermined level of the output from the light receiving element is obtained, i.e. such that the line 25 is contacted. The angle of this rotation is detected by a resolver in the controlling device 70. The controller decomposes the rotation angle into X and Y components in accordance with which an X-axis drive motor 13 and a Y-axis driving motor 17 are driven to make the optical profiling head 12 trace the lines drawn on the drawing 24. Thus, the optical profiling head 12 is moved to trace the line 25, as the X-axis and Y-axis motors 13 and 17 are driven in accordance with the signals from the controller 70.

Reference numerals 14 and 16 denote X and Y-axes guides, respectively, for guiding the movement of the head 12 in X and Y directions, respectively. An X-axis pulse generator and a Y-axis pulse generator for detecting the movement of the profiling head 12 are designated by reference numerals 15 and 18, respectively.

Figure 4:
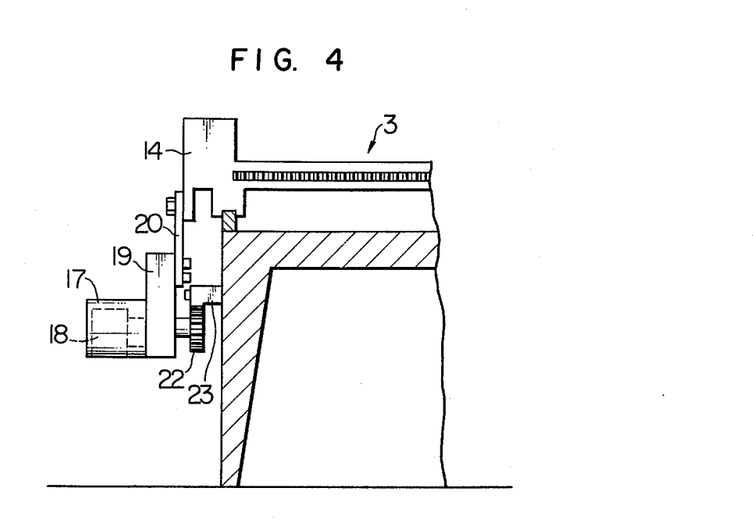
FIG. 4 is a sectional view taken along the line IV—IV of FIG. 2.

FIG. 4 shows the construction for a device for providing pulses proportional to the movement of the profiling head 12. More specifically, the X-axis guide 14 supports the profiling head 12 for free movement in the X direction. Parts such as a gear box 19, pinion 22, rotary encoder and so forth constituting the pulse generator 18 and movable together with a base 21 are attached to the side surface of the X-axis guide 14. A reference numeral 23 denotes a rack attached to the side surface of the body of the optical profiling device 3. As the base 21 is moved in Y direction, the pinion meshing with the rack 23 is rotated and a movement proportional to this rotation is imparted to the shaft of the pulse generator 18. It is therefore possible to obtain pulses proportional to the optical movement of the profiling head 12. The movement of the optical profiling head 12 in X direction can be detected in a similar manner.

Figure 6:
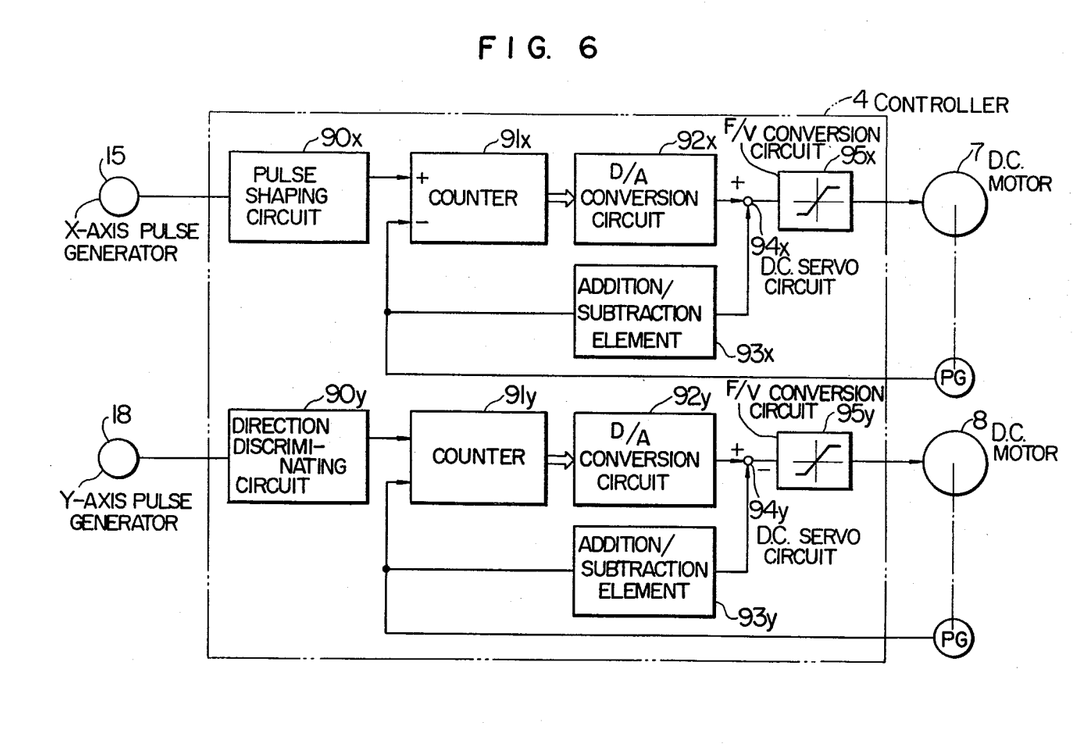
FIG. 6 is a block diagram schematically showing the construction of a control device.

After the conversion of the movement of the optical profiling head 12 into electric pulses, a table 9 of the polishing machine 2 is driven by means of D.C. motors 7 and 8. The controller 4 has a circuit for converting the number of pulses delivered by the pulse generators 15, 18 into D.C. voltages proportional to the number of pulses. More specifically, as shown in FIG. 6, the converting circuit includes a pulse shaping circuit 90X, direction discriminating circuit 90Y, counters 91X and 91Y for extracting deviations, D/A conversion circuits 92X, 92Y, addition/subtraction elements 93X, 93Y, D.C. servo circuits 94X, 94Y and F/V conversion circuits 95X and 95Y.

Figure 5A:
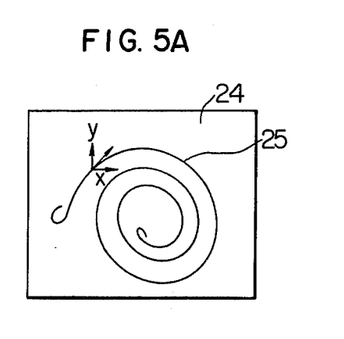
FIG. 5A shows a drawing which is placed on an optical drawing profiling device.
Figure 5B:
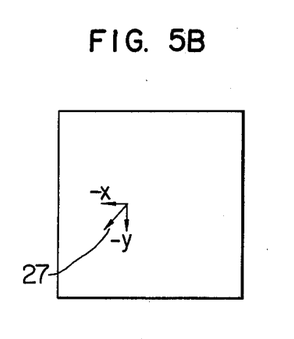
FIG. 5B shows the velocity of movement of the polishing table.

Therefore, the polishing tool 5 attached to the end of a self-guided profiling head 10 is moved along a path at a predetermined profiling velocity 21, the path profiling the line 25 of tool movement in the drawing 24 placed on the table of the optical profiling device as shown in FIG. 5A. On the other hand, the table of the grinding machine 2 is moved in the counter direction 27, so that the apparent locus of movement of the polishing tool 5 is same as that of the optical profiling head 12.

Since the controller 4 is provided with a circuit for selecting number of pulses picked up, it is possible to obtain the displacement of the grinding machine as a predetermined contraction scale of the displacement of the profiling head.

With this construction of the automatic polishing apparatus, the table of the polishing machine is moved to provide an apparent path of locus of movement of the polishing tool 5 which exactly traces and profiles a predetermined locus or path given as a line in the drawing. A tolerance of locus of movement of the polishing tool 5 falling within a range of between ±0.1 mm and ±0.5 mm is acceptable.

The path or locus of movement of the polishing tool 5 can thus be set in a short time simply by drawing a line by freehand. The preparation time is also shortened, because the only work required is to check if there is any point of intersection in the drawn line.

Hereinbelow, an explanation will be given as to the self-guided profiling head 10 for making a profiling in Z direction, i.e. in the depthwise direction of the article 6 to be polished, with specific reference to FIG. 1 and FIGS. 7 to 10 inclusive.

Referring to these Figures, a polishing head body generally designated by the numeral 26 includes a frame 27 and a motor supporting frame 30 carrying a tool driving motor 29 having an output shaft coupled to a rotary shaft 28 to which attached is the polishing tool 5. The motor supporting frame 30 is rotatably supported with its spherical portion seated on a spherical seat 34 provided at the lower end of the frame 27. A spring 30 is disposed between the lower portion of the frame 27 and the motor supporting frame 30 so as to carry the weight of the motor supporting frame 30 and also the weight of the motor 29. A displacement detecting shaft 33 is supported for free vertical sliding movement along a linear bearing 32 on the upper portion of the frame 27. A steel ball 37 connects a V-shaped groove 35, formed at the upper end of the motor supporting frame 30, to a V-shaped groove 36 formed at the lower end of the displacement detecting shaft 33. The steel ball 37 is adapted to convert the inclination amount of the motor supporting frame 30 into the vertical (Z direction) displacement of the displacement detecting shaft 33. A displacement detector 38 constituted by a magnet sensor or the like is disposed in opposition to the displacement detecting shaft 33 so as to detect the displacement thereof. An adjusting nut is screwed to the upper end of the displacement detecting shaft 33 and a load adjusting spring 41 is disposed between the upper portion of the adjusting nut 39 and a bracket 40 which is integrally attached to the frame 27.

Figure 7:
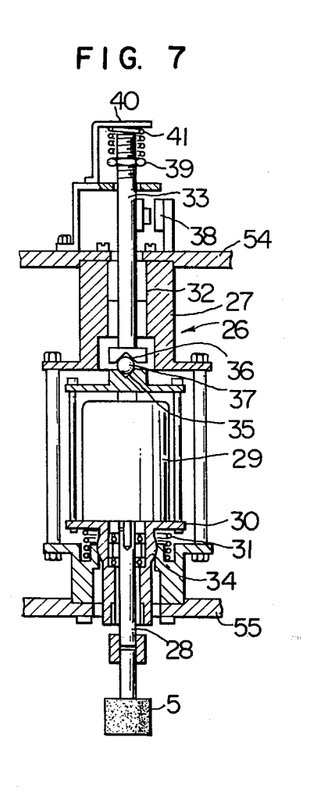
FIG. 7 is a sectional view of a polishing head.
Figure 8:
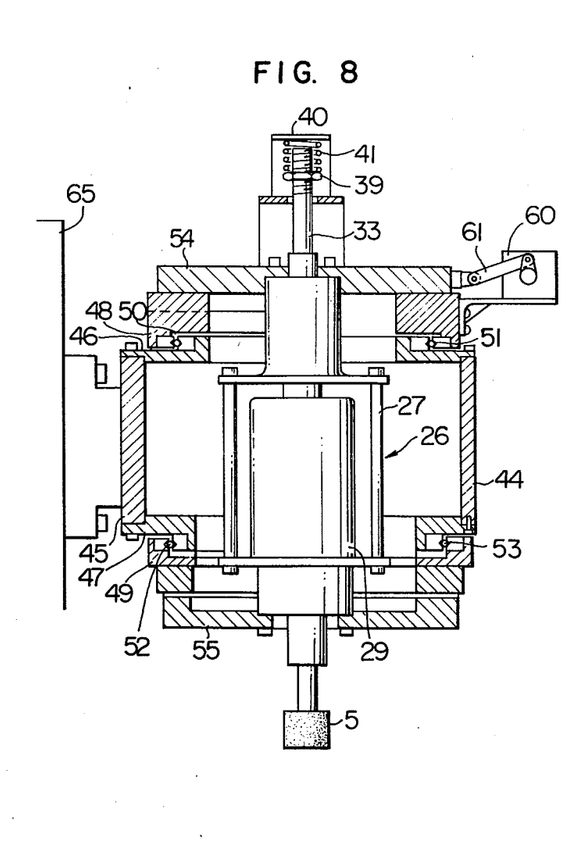
FIG. 8 is a sectional side elevational view of a self-guiding profiling type head (reciprocating head)
Figure 9:
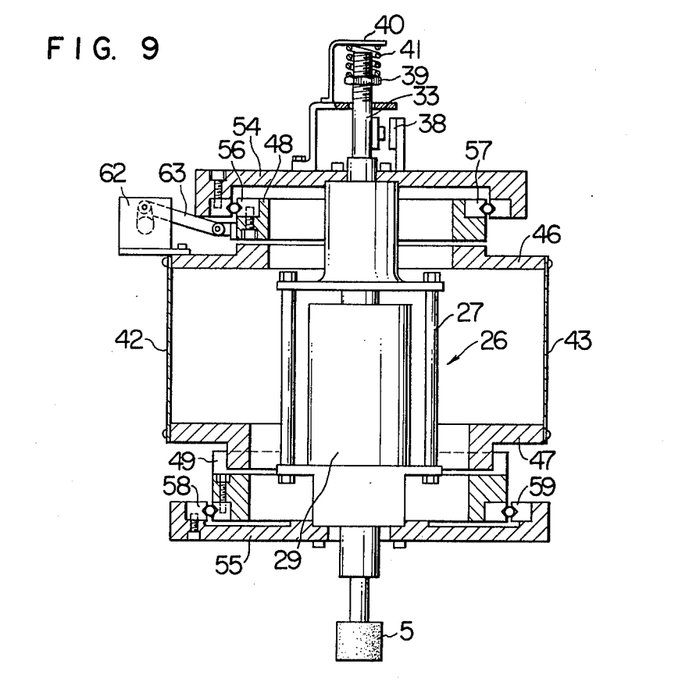
FIG. 9 is a front elevational view of the reciprocating head as shown in FIG. 8.

Further, the polishing or grinding head body 26 is enclosed by covers 42, 43 and supporting pates 44, 45. Breadthwise guide plates 46, 47 for making a guide in breadthwise or right and left direction are secured to the upper and lower edges of the supporting plates 44, 45. Crosswise/breadthwise guide plates 48, 49 for making a guide in the breadthwise and crosswise or back and forth direction are disposed at the outside of the breadthwise guide plates 46, 47. Breadthwise ball guides 50, 51 and 52, 53 are disposed between the breadthwise guide plates 46, 47 and the crosswise/breadthwise guide plates 48, 49 outside the latter.

Crosswise guide plate 54, 55 are provided on the crosswise/breadthwise guide plate 48 and beneath the crosswise/breadthwise guide plate 49, through mediums of ball guides 56, 57 and 58, 59, respectively. A crosswise oscillation motor 60 is connected to the crosswise guide plate 54 through a connecting rod 61, while a breadthwise oscillation motor 62 is connected through a connecting rod 63 to the crosswise guide plate 48.

Figure 10:
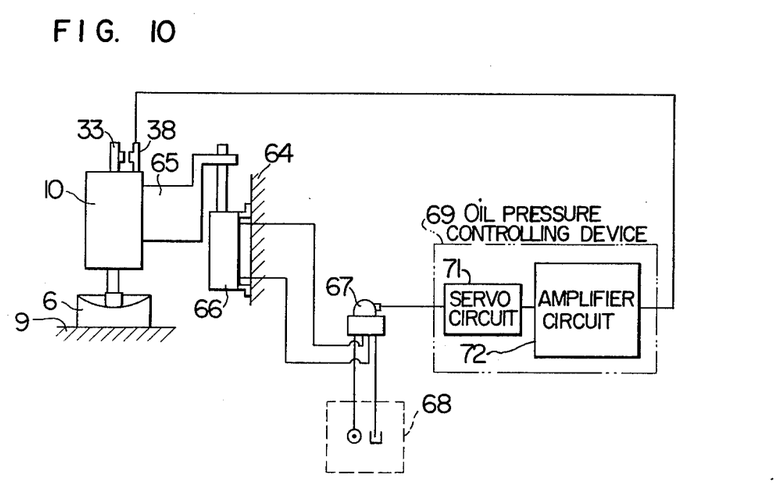
FIG. 10 schematically shows the construction of a device for controlling the self-guiding profiling head.

The supporting plate 45 is attached to a liftable member 65 which is adapted to be freely moved up and down along a pole on a column 64. The liftable member 65 is connected to a hydraulic cylinder 66 attached to the column 64. A reference numeral 67 designates a servo valve for causing a vertical stroking of the hydraulic cylinder 66, while the reference numeral 68 denotes a hydraulic pump. An oil pressure control device 69 has an amplifier circuit 72 for amplifying a signal delivered by a displacement detector 38, and a servo circuit 71 for controlling the operation of the servo valve 67.

In operation, the hydraulic cylinder 66 is actuated to vertically locate the polishing head body 26 to put the polishing tool 5 into contact with the curved surface to be polished, and the tool driving motor 29 is started to drive the polishing tool. During polishing, the hydraulic cylinder 66 is always controlled to lift or lower the polishing head body 26 in accordance with the detection output from the displacement detector 38 for detecting the displacement of the displacement detecting shaft 33, such that the displacement detecting shaft 33 always takes a reference position, i.e. such that the signal derived from the displacement detector 38 always takes a reference level, thereby to effect the polishing by self-guiding profiling on the curved surface of the article 6 to be ground.

As stated before, the grinding head is provided with two motors 60, 62 for reciprocating motions, as well as upper and lower slide guides 51, 52, 53, 54, 56, 57, 58, 59. As the oscillation or reciprocation motor 60 is energized, the grinding or polishing head body 26 is moved in the crosswise or back and forth direction along the crosswise guide plates 54, 55 and along the crosswise/breadthwise guide plates 48, 49, whereas, when the oscillation or reciprocation motor 62 is energized, the grinding or polishing head body 26 is moved breadthwise or right and left direction along the breadthwise guide plates 46, 47 and the crosswise/breadthwise guide plates 48, 49.

Therefore, the grinding head body 26 can make smooth reciprocating movement of predetermined amplitudes in both of crosswise and breadthwise directions, even when a radial load is applied to the grinding tool 5. Since the weight of the grinding head body 26 including the reciprocation motors 60, 62 and other parts is 30 Kg at the heaviest, motors of small capacity such as 50 W or smaller can be used as the reciprocation motors, and the consumption of electric power is reduced accordingly. In addition, it is possible to change the amplitude of the reciprocations in both directions by changing the eccentricities of respective connecting rods. The automatic grinding apparatus of the invention makes it possible to easily grind the free curved surface of large molds having weights of hundreds to thousands kilograms, with a high dimensional precision of the worked surface, and does not necessitate driving motors of large capacity nor reciprocatable table. In addition, it is not necessary to employ protective covers as used in the conventional apparatus, even when the polishing oil and grains are scattered from the surface under polishing.

Hereinafter, a description will be made as to the device for achieving a uniform polishing of the curved surface of the article 6 by, for example, rotating the article 6, with specific reference to FIGS. 11 to 17.

Figure 12:
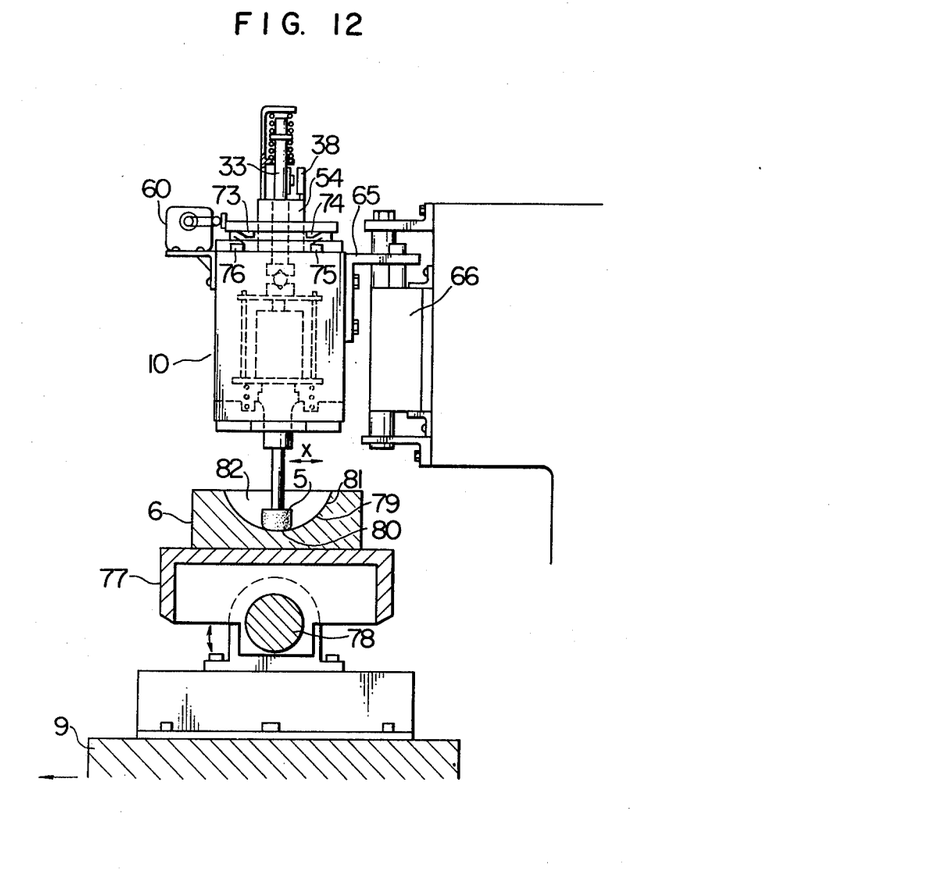
FIG. 12 is a partly sectioned side elevational view of the device shown in FIG. 12.

The mechanisms constituting this device can broadly be sorted into a mechanism associated with a reciprocating polishing head 10, and a mechanism for rotatively driving the article 6 to be ground. The reciprocating polishing head 10 is attached to and supported by a hydraulic cylinder 66 so that it profiles the curved surface in the up and down direction imparts a predetermined polishing load. To the lower end of the reciprocating polishing head 10, is attached a rotary resilient tool 5 (or abrasive stone) as the polishing tool. The resilient tool 5 is adapted to make a reciprocating movement in X direction as shown in FIG. 12. This reciprocating movement is caused by the reciprocation motor 60 mounted on the reciprocating polishing head 10. As the reciprocation motor 60 is energized, for example, the crosswise guide plate 54 having dogs 73, 74 is driven to make a reciprocating movement, which in turn drives the rotary resilient tool 5 in X direction reciprocatingly. The other reciprocating motor 62 is adapted to reciprocatingly drive the rotary resilient tool 5 in Y direction. In carrying out the invention, it is necessary to detect the direction of movement during the reciprocating operation, as well as the height of the point on the curved surface under polishing. In the described embodiment, the direction of the reciprocating movement is detected by means of limit switches 75, 76 which are adapted to be opened and closed by the dogs 73, 74. Namely, it is judged that the rotary resilient tool 5 is positioned at the stroke end of the reciprocating movement, when the corresponding limit switch 75 (76) is closed. The height of the point on the curved surface under polishing is detected in the described embodiment by a cooperation of the displacement detector 38 and the displacement detecting shaft 33.

Figure 11:
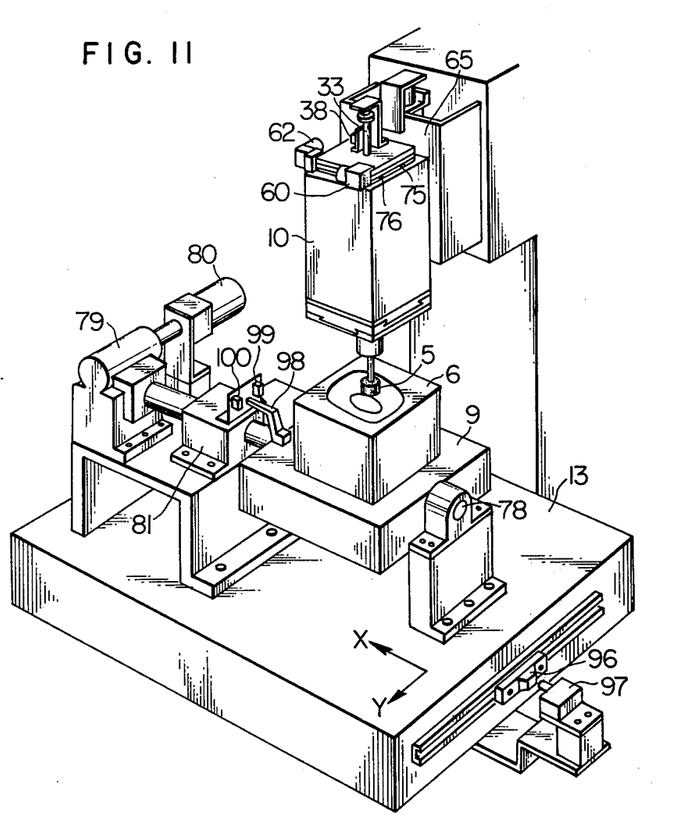
FIG. 11 is a perspective view of a device for controlling the rotation of the article to be polished.

The mechanism for rotatively driving the article 6 to be polished includes a rotary table 77 on which the article 6 is mounted, a rotary shaft 78 connected to the rotary table 77, a worm reduction gear 79 coupled to the rotary shaft 78, and a D.C. motor 80 operatively connected to the rotary shaft 78 through the worm reduction gear 79. Thus, the rotary table 77 is reversibly driven by the D.C. motor 80. the rotary shaft 78 is rotatably supported by a support 81. The control of the D.C. motor 80 will be described later.

The automatic polishing apparatus of the invention having the described construction operates in the manner described below. For polishing a curved surface 82a of the article 6 by the automatic grinding apparatus of the invention, the table 9 is moved in the direction of arrow as shown in FIG. 12, while energizing the reciprocation motor 60 to cause a reciprocating movement of the rotary resilient tool 5 in the X direction. The frequency and the amplitude (sum of amplitudes in both directions) are, for example, 20 to 40 cycle/min. and 5 mm.

Figure 13A:
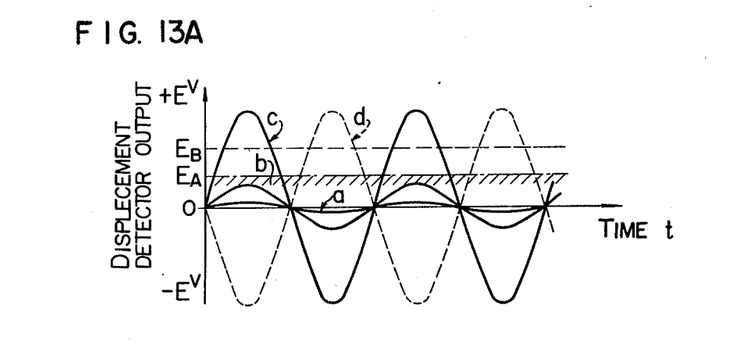
FIG. 13A shows the wave form of the output from a displacement detector.
Figure 13B:
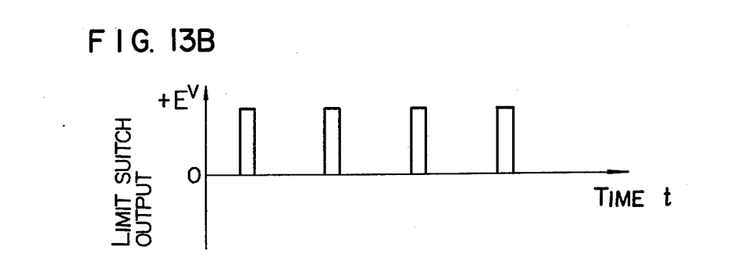
FIG. 13B shows the wave form of the output from a limit switch.

When the rotary resilient tool 5 is polishing bottom area 82b of the curved surface or its vicinity, the level of the wave form a of the output from the displacement detector 38 is relatively low as shown in FIG. 13A. Then, as the article 6 is moved by a further feed of the table 9, the displacement detecting shaft 33 is raised to provide an output wave form b. Further, as the tool 5 commences to polish the side portion 82c of the curved surface, the displacement detector 38 provides an output wave form c. To the contrary, when the rotary resilient tool 5 is polishing the opposite side portion 82d of the curved surface, the displacement detector 38 provides an output wave form d. In this case, the level of the output wave form is considered to represent the height of the polishing position on the curved surface 82a. It is therefore necessary, when the level of the output wave form comes to exceed a predetermined level, to rotate the article 6 to make the output level fall within the predetermined range. The direction of rotation of the article 6 is limited by the outputs from the limit switches 75, 76. More specifically, as shown in FIG. 13B, the limit switches 75, 76 deliver outputs alternatingly each time the rotary resilient tool 5 reaches the end positions of the reciprocating movement. In FIG. 13B, the output shown by hatching is the output from the limit switch 76. The direction of rotation of the article 6 is controlled making use of these outputs.

Figure 14:
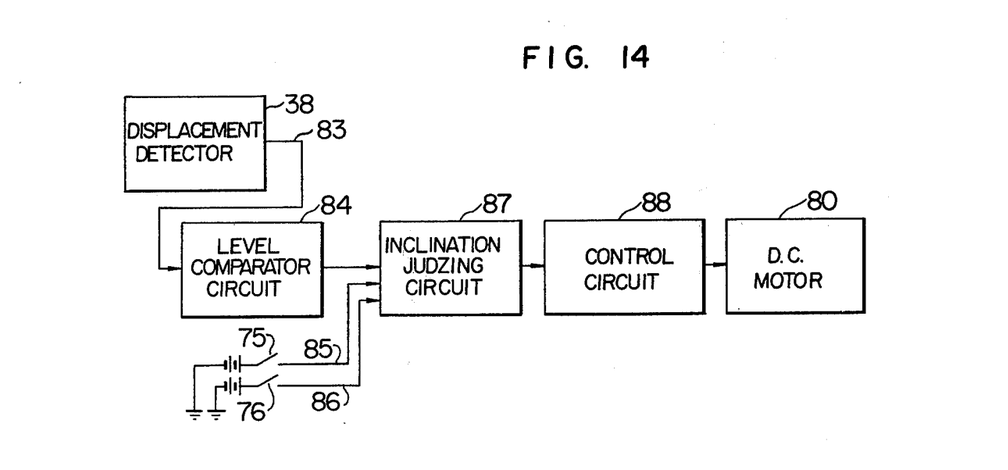
FIG. 14 is a schematic block diagram of a system for rotating a rotary table.

FIG. 14 is a block diagram of a circuit for reversibly controlling the D.C. motor 80 for rotatively driving the article 6. This circuit has a level comparator circuit 84 adapted for comparing the output 83 from the displacement detector 38 with a reference voltage EA. When the output level from the detector 38 exceeds the reference voltage EA, the direction of inclination is judged by an inclination judging circuit 87 in accordance with the outputs 85, 86 from the limit switches 75, 76. Then, in accordance with the output from this inclination judging circuit 87, a control circuit 88 controls the D.C. motor to rotate the output shaft in the desired direction, so that the output from the displacement detector 38 comes down below the reference voltage EA. Consequently, the control is made so as to maintain the output from the displacement detector 38 below the level of the reference voltage Ea. As the output level from the detector 38 comes down below the reference voltage EA, the D.C. motor 80 is stopped and the curved surface 79 of the article 6 is polished in this condition. Thus, when the side portion 81 of the curved surface is polished by the rotary resilient tool 5, the article 6 is kept inclined or tilted clockwise.

As has been described, in the automatic polishing apparatus of the invention, the D.C. motor 80 is controlled so as to maintain the output level from the displacement detector 38 within a range below the reference voltage EA. This manner of control, however, is suitable for use in polishing with an abrasive wheel provided with a universal joint, rather than in grinding with a rotary resilient grinding tool 5 in which the polishing amount is comparatively small.

Therefore, when the rotary resilient tool 5 is used as the polishing tool, the D.C. motor 80 is controlled so as to maintain the output level from the displacement detector 38 within a range between the reference voltages EA and EB as shown in FIG. 13A. By so doing, it is possible to enable the rotary resilient tool 5 to grind the curved surface 82a at a large polished amount with a small contact area.

To this end, when the side portion 82 of the curved surface is polished by the rotary resilient tool 5, the article 6 is rotated leftward and rightward, respectively, as an A.C. wave form having a peak value exceeding the reference voltage EB and an A.C. wave form having a peak value smaller than EA are derived from the displacement detector 38. As a result, the output level from the displacement detector 38 is maintained within the region of between the reference voltages EA and EB. The rotary resilient tool 5 performs a polishing at a large polishing amount as long as the output level from the displacement detector 38 is maintained within the level between the reference voltages EA and EB.

In the described embodiment, the article 6 is rotated by rotating the rotary table 77 through the rotary shaft 78. It is, therefore, possible to effect the same control also in Y direction, by an arrangement such that the rotary table 77 rotatably carries another rotary table which is adapted to be rotated by another rotary shaft which extends at a right angle to the rotary shaft 78. This rotation of the another rotary shaft is caused by the aforementioned reciprocation motor 62. Also, a pair of limit switches are disposed in combination with the motor 62, similarly to the limit switches 76, 76 combined with the reciprocation motor 60.

In the described embodiment, the article 6 to be ground is rotated while the grinding head is kept stationary. However, it will be clear to those skilled in the art that an equivalent control is effected by rotating the reciprocating head while keeping the article 6 stationary.

Thus, according to the invention, it is possible to effect a profiling polishing on the entire part of the curved surface, by automatically controlling the rotation of the article 6 to be polished or the reciprocating head, in accordance with the results of detection of the height of the polishing position on the curved surface and the direction of reciprocating momvement of the grinding tool, during grinding of the surface by the polishing tool 5.

As shown in FIG. 11, a dog 96 is provided on one side surface of the table 9. Also, a limit switch 97 is attached to the X direction table to cooperate with the dog 96. Further, limit switches 99, 100 are provided on the support 81 so as to cooperate with a dog 98 attached to the rotary table 77 in limiting the angle of rotation of the rotary table 77 in both of left and rightward directions. In operation, the direction of rotation of the article 6 is given by a depression of a reset button on the control stand 1. As the dog 96 is moved to the right to turn the limit switch 97 on, the article 6 is rotated leftward until the angle-limiting limit switch 100 is turned on. The leftward rotation of the article 6 is therefore stopped, and the left side portion of the concaved curved surface is polished by the rotary tool 5. Then, as the limit switch is turned on by a leftward movement of the dog 96, the article 6 to be polished is rotated rightward until the angle-limiting limit switch 99 is turned on. As the limit switch 99 is turned on, the rightward rotation of the article 6 is stopped to make the rotary tool 5 polishing the right side portion of the concaved curved surface.

It is therefore possible to polish a free curved surface having symmetrical steep slopes or gradients, at a sufficiently high contact pressure of 1 to 2 Kg/cm$^2$, resulting in a remarkably improved polishing efficiency.

Hereinafter, a description will be made as to the resilient polishing tool which is used as the polishing tool 5 in the described embodiment and which has a long life to allow the operator to leave the tool 5 in the automatic polishing apparatus of the invention for a longer period of time thereby remarkably improving the efficiency of the polishing work.

Figure 15:
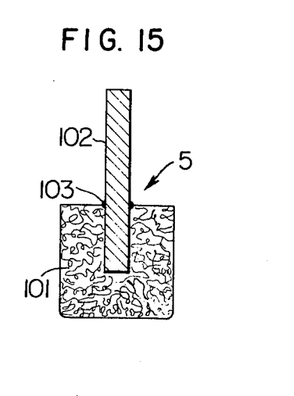
FIG. 15 is a sectional view of a resilient polishing tool used in the apparatus of the invention.

Referring to FIG. 15, a reference numeral 101 denotes a non-woven fabric which is formed into a columnar shape by arranging irregularly fibrous materials such as nylon threads and fixing them together. The nylon threads used for the formation of this non-woven fabric has a thickness of, for example, 210 to 420 deniers. The non-woven fabric thus formed exhibits a specific weight of 0.25 or larger, and an apparent rubber hardness of 30 to 70 duro. A reference numeral 102 denotes a shaft inserted into the non-woven fabric 101 and is adapted to be attached, for example, to the polishing apparatus such as self-guided profiling type apparatus. The shaft 102 is fixed to the non-woven fabric 101 by means of an adhesive. Since the non-woven fabric 101, formed by the nylon threads exhibits an apparent resiliency equivalent to that of rubber, the tool thus constructed can effectively polish the curved surface of the mold profiling that surface while keeping a surface contact with the surface. In addition, since the non-woven fabric 101 is formed with irregularly arranged nylon threads entangling one another, the tool can serve over a long period even when the nylon threads constituting the tool surface are worn or broken during a polishing under a supply of free grains. Thus, the life of this tool is materially semipermanent.

The non-woven fabric 101, as stated above, can easily be produced by at first binding and fixing nylon threads into the form of a large block and then punching them into pieces by a press. Needless to say, the nylon threads mentioned in the above explanation is not exclusive, and various other materials can be used in place of the nylon threads.

Figure 16:
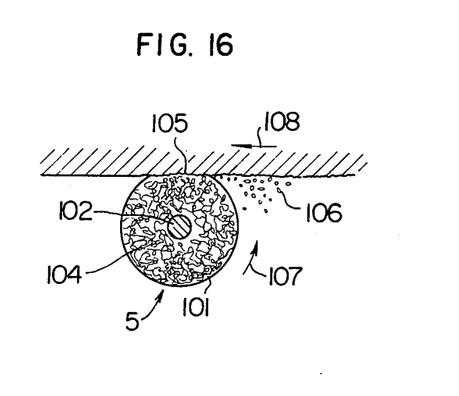
FIG. 16 shows how the polishing is effected with the polishing tool shown in FIG. 15.

FIG. 16 illustrates a polishing work conducted with the polishing tool as shown in FIG. 15. Referring to this Figure, a reference numeral 104 denotes the surface of the non-woven fabric 101, i.e. the polishing surface, while reference numeral 105 denotes the surface to be polished. Grains are designated at reference numeral 106. In order to efficiently polish the surface 109 as illustrated, it is necessary to make the direction of rotation of the tool represented by an arrow 107 coincide with the direction of feed of the article to be polished as represented by an arrow 108, so that the grains 106 may be introduced by the tool into contact with the surface 105. This way of polishing is usually referred to as "down-cut". In case of an "up-cut" in which the polishing tool is rotated in the reverse direction to the direction of feed, the free gains 106 are splashed away from the surface 105 by rotating polishing tool 5, so that it is not possible to effectively polish the surface 105 by cooperation with the tool 5 and the grains 106.

Figure 17:
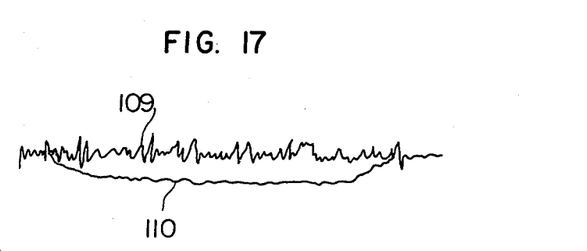
FIG. 17 illustrates the states of the surface before and after the polishing with the polishing tool as shown in FIG. 15.

FIG. 17 illustrates a roughness of the surface which is polished by the down-cut processing as illustrated in FIG. 16, with the polishing tool as shown in FIG. 15. The roughness of the surface before processing is 10 $\mu$m. The processing or polishing condition was as follows:

(1) material of article polished, i.e. material of the mold: S50C
(2) size of tool: 15$\phi \times$15L
(3) revolution speed of tool: 3000 r.p.m.
(4) polishing load: 1.1 kg
(5) grain size of grains: 15 $\mu$m dia.
(6) velocity of feed of mold (or tool): 50 mm/min.
(7) pick feed: 1 mm After the polishing, the surface roughness is reduced to about 2 $\mu$m. It has been confirmed also that no substantial problem is caused in connection with the life of the tool. In FIG. 17, a reference numeral 107 designates the surface of the article, i.e. mold, after the polishing.

Although it was attempted to improve the surface condition by increasing the number of repetition of polishing, no substantial improvement of the surface condition was observed with such a measure. This can be attributed to the fact that the naps of the nylon threads constituting the tool surface shows an affinity to the surface to be polished.

Figure 18:
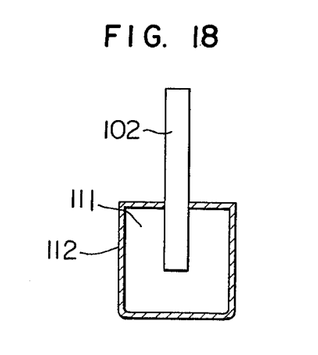
FIG. 18 is a sectional view of a polishing tool adapted particularly for precision polishing.
Figure 19:
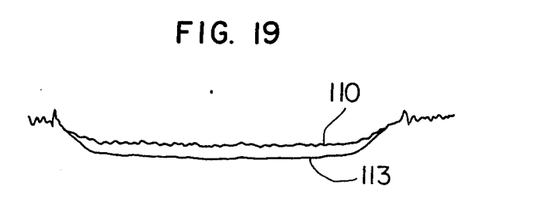
FIG. 19 shows the states of the surface before and after the polishing with the polishing tool shown in FIG. 18.

Therefore, a final polishing was effected by the down-cut method employing a tool which is constituted, as shown in FIG. 18, by a rubber body 111 and a fibrous body 112 formed by superposing two sheets of nylon cloth of 210 denier, under a supply of free gains. As a result, the surface 110 of the mold was finished into a mirror surface 113 of 0.5 $\mu$m Rmax, as shown in FIG. 19.

Since the tool as shown in FIG. 18 has a smooth surface, this tool has an effect to provide a uniform finishing of the polished surface.

By employing a polishing tool which is constituted as described by a resilient non-woven fabric formed with fibrous materials irregularly disposed and fixed to one another and a shaft body fixed to the non-woven fabric, it is possible to polish the surface to a fineness of 2 to 3 $\mu$m Rmax without requiring the replacement of the tool. The subsequent or final finishing into a mirror surface of 1 $\mu$m Rmax can be achieved by a polishing employing a tool having a cloth wound round a rubber body. It is therefore possible to automatically polish the free curved surface of a mold by only one tool replacement. Consequently, the time over which the operator has to stand by the polishing apparatus is greatly reduced and the efficiency of the polishing work is improved accordingly.

Figure 20:
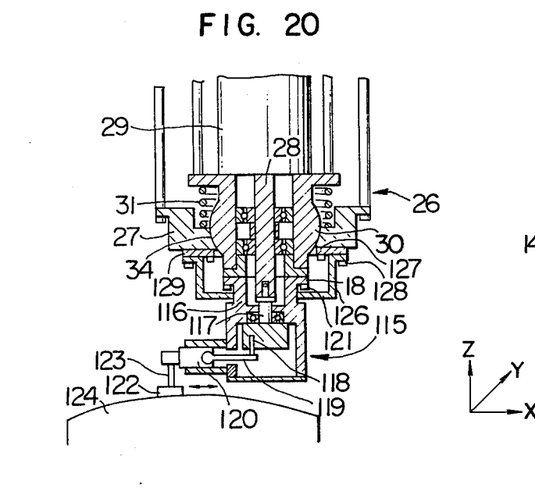
FIG. 20 is a sectional view of the end portion of a polishing apparatus of tool reciprocating type.

For polishing an article such as a mold having a curved surface of a large curvature or a groove, it is necessary to employ a profiling polishing machine of tool reciprocation type. To this end, as shown in FIG. 20, an attachment generally designated by the reference numeral 115 for tool reciprocation is attached to the lower end of the head 26. This attachment 115 is constituted by a main body 116 secured to the lower end of the motor supporting frame 30 by bolts 121, a rotary shaft 117 coupled to the lower end of the rotary shaft 28 and disposed in the main body 116, an eccentric shaft 118 attached to the rotary shaft 117 at a certain eccentricity from the latter, a crank fixed at its one end to the eccentric shaft 118, and a reciprocating piston 120 rotatably attached to a spherical portion on the other end of the crank 119.

A polishing member 122 for polishing the surface of a work 124 is connected operatively to the reciprocating piston 120 of the attachment 115 through a shaft 123. In order to prevent the attachment 115 from rotating in a horizontal plane, the attachment 115 as a whole is made to have an angular or polygonal cross-sectional shape, and an L-shaped spring guide 126 having a spring-like function is disposed along each of four sides of the attachment 115. Each spring guide 126 is fixed by means of bolts 127 to a guide fixing flange 129 which, in turn, is fixed to the lower end of the main body 27 by means of bolts 128.

By supporting the attachment 115 in the described manner, the attachment 115 is prevented from rotating in the horizontal plane defined by X and Y-axes, but is allowed to tilt within vertical planes defined by X and Z-axes and Y and Z-axes. This arrangement permits the maintaining of a constant direction of reciprocating motion in relation to the work, as well as a smooth displacement, resulting in a superior self-guiding profiling. For reducing the friction, the portion of each spring guide 126 contacting the attachment 115 may be rounded or may be provided with needle rollers.

Figure 21:
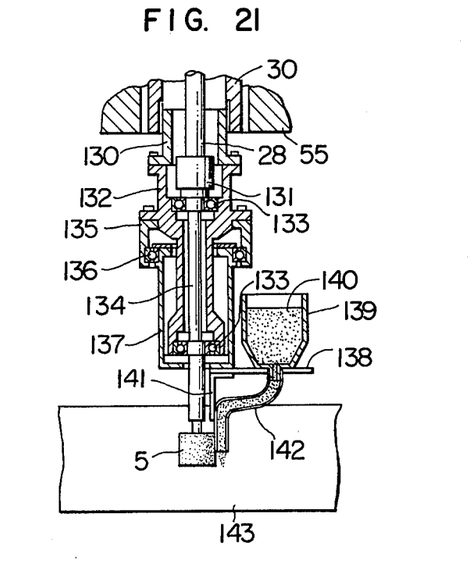
FIG. 21 is a sectional view of a polishing device adapted to perform a polishing while supplying a grain liquid.
Figure 22:
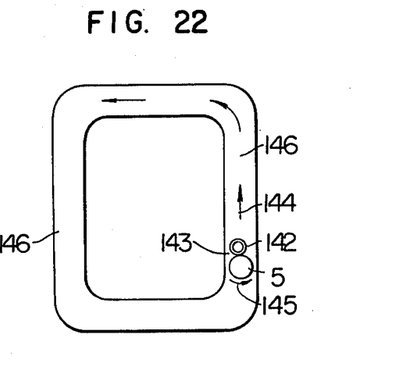
FIG. 22 is an illustration of a relationship between the tool and a nozzle for supplying the grain liquid as used in the polishing apparatus shown in FIG. 21.

Hereinafter, an explanation will be made with reference to FIGS. 21 and 22, to a polishing apparatus employing a resilient polishing tool 5 made of non-woven fabric under a continuous supply of a polishing liquid 140 prepared by mixing grains with a polishing oil to an area in the vicinity of the tool 5. The supply of the polishing liquid 140 is made to such an area that the supplied liquid is effectively brought into contact with the surface 143 to be polished, i.e. to an area ahead of the tool 5 as viewed in the direction of movement of the tool 5.

A holder 130 is attached to the end of the motor supporting frame 30. A reference numeral 132 denotes a support for supporting a spindle 134 which is rotatably held by a bearing 135. The spindle 134 is operatively connected to the rotary shaft 28 through a flexible coupling 131. A resilient tool 5 made of non-woven fabric is attached to the lower end of the spindle 134. Another holder 135 is attached to the support 132, and a rotary holder 137 is placed at the inside of a bearing 136. Attached a to lower part of the rotary holder 137 is a plate 138 on which is mounted a polishing liquid tank 139 which is filled with a polishing liquid 140 prepared, as stated before, by mixing grains with a polishing oil.

A polishing liquid supplying nozzle 142 made of such a material as would not damage the polished surface when contacted by the latter, e.g. nylon, extends from the bottom of the tank 139 via a guide 141 into contact with the peripheral surface of the non-woven fabric resilient tool 5. Then, as the tool 5 is rotated, the nozzle 142 is biased in the direction of rotation of the tool 5 as shown by an arrow, due to a friction between the nozzle and the tool 5. Consequently, the polishing liquid tank 139, plate 138 and the rotary holder 137 are rotatively biased as a unit around the axis of the tool 5.

Therefore, for polishing the tapered surface 143 of the work 146 while feeding the tool 5 in the direction of an arrow 144, the polishing liquid 140 is always supplied to the leading side of the tool 5 as viewed in the direction of the feed. As a result, the polishing liquid is effectively caught by the tool 5 and comes to exist between the polishing tool 5 and the surface under polishing.

Consequently, the wear of the polishing tool is remarkably reduced, and the polishing amount can be increased by several to ten times as compared with the polishing employing solely the tool 5 without the aid of the polishing liquid. It is therefore possible to automatically and efficiently polish even rather coarse or rough surface into fine and smooth surface.

What is claimed is:

1. An automatic polishing apparatus comprising, in combination:
    a profiling device including a tracer adapted to automatically trace a line which has been drawn in a drawing to give a path of movement for a polishing tool in a plane defined by X and Y-axes, and detecting means for detecting the displacement of said tracer in the directions of the X and Y axes; and
    a polishing machine including feeding means adapted to feed one of a table mounting a workpiece to be ground and a polishing head body carrying a polishing tool relative to each other in the directions of the X and Y axes in accordance with signals derived from said detecting means of said profiling device and representing said displacements of said tracer in the directions of the X and Y-axes, a detector provided on said polishing head body for detecting one of a pressure applied to said polishing tool and a displacement caused by said pressure with respect to the workpiece, and polishing control means adapted to move one of said polishing head body and said table relative to each other in a direction of a Z-axis in accordance with an output signal derived from said detector so that a self-controlled profiling movement for polishing a three-dimensional curved surface is carried out under a substantially constant pressure of the polishing tool on a three-dimensional curved surface of the workpiece.

2. An automatic polishing apparatus comprising, in combination:
    a profiling device including a tracer adapted to automatically trace a line which has been drawn in a drawing to give a path of movement for a polishing tool in a plane defined by X and Y-axes, and detecting means for detecting the displacement of said tracer in the directions of the X and Y-axes; and
    a polishing machine including feeding means adapted to feed one of a table mounting a workpiece to be polished and a polishing head body carrying a polishing tool relative to each other in the directions of X and Y-axes in accordance with signals derived from said detecting means representing said displacements of said tracer in the directions of the X and Y-axes, a motor supporting frame provided with a motor having an output shaft connected to said polishing tool, said motor supporting frame being suspended from said polishing head body and being movable in three-dimensional directions, a displacement shaft carried by said polishing head body in engagement with said motor supporting frame and displaceable in the direction of the Z-axis, a displacement detector provided on said polishing head body and adapted to detect a displacement of said displacement shaft, and polishing control means adapted to move one of said polishing head body and said table relative to each other in a direction of the Z-axis in accordance with an output signal derived from the displacement detector so that a self-controlled profiling movement for polishing a three-dimensional curved surface of the workpiece is carried out under a substantially constant pressure of said polishing tool on said three-dimensional curved surface of the workpiece.

3. An automatic polishing apparatus as claimed in claim 2, wherein said polishing apparatus further includes reciprocation means adapted to reciprocatingly move said polishing head body in the direction of the X and Y-axes at predetermined amplitudes during polishing of the three-dimensional curved surface by said polishing tool.

4. An automatic polishing apparatus as claimed in claim 3, wherein said polishing apparatus further includes rotary motion means adapted to cause rotation of one of said table and said polishing head relative to each other around the X and Y-axes, said polishing head being provided with said polishing head body and said reciprocation means, detecting means adapted to detect whether a slope of the polishing position on said curved surface of the three-dimensional curved surface is ascending or descending and to determine a direction of rotation caused by said rotary motion means, and rotational displacement control means adapted to control a rotational displacement caused by said rotary motion means in response to an output signal derived from said displacement detector.

5. An automatic polishing apparatus as claimed in claim 3, wherein said polishing apparatus further includes rotary motion means adapted to cause rotation of one of said table and said polishing head relative to each other around the X and Y-axes, said polishing head being provided with said polishing head body and said reciprocation means, detecting means adapted to detect whether a slope of the polishing portion of said three-dimensional curved surface is ascending or descending and to determine a direction of rotation caused by said rotary motion means, and setting means adapted to set beforehand a rotational displacement to be effected by said rotary motion means.

6. An automatic polishing apparatus as claimed in claim 5, wherein said polishing tool includes a non-woven fabric formed by irregularly arranging fibrous materials and fixing them to form a body having a resiliency, and a shaft body fixed to said non-woven fabric.

7. An automatic polishing apparatus as claimed in claim 6, wherein said fibrous material is threads of nylon.

8. An automatic polishing apparatus as claimed in claim 2, wherein said polishing apparatus further includes an attachment body attached to one of said motor supporting frame, a piston mounted on said attachment body for a linear reciprocating movement in a horizontal direction, a crank through which said piston is connected to the output of the motor, and spring guides secured to a lower end of said polishing head body, said spring guides being adapted to engage said attachment body to prevent the same from rotating and to allow said motor supporting frame to be tilted together with said attachment body.

9. An automatic polishing apparatus as claimed in claim 5, wherein said polishing tool of said polishing machine is formed to have a columnar shape and is disposed such that its axis extends in a direction of Z-axis, said polishing tool being adapted to be rotatively driven by said motor.

10. An automatic polishing apparatus as claimed in claim 2, wherein said polishing apparatus further includes a polishing liquid tank rotatably carried by an end portion of said motor supporting frame, and a polishing liquid supplying nozzle connected to said polishing liquid tank and engaging a peripheral surface of said polishing tool so as to be rotated accompanying said polishing tool.

11. An automatic polishing apparatus as claimed in claim 2, wherein said motor supporting frame is formed with a V-shaped groove in an upper end thereof, said displacement shaft is formed with a V-shaped groove in a lower end thereof, and said motor supporting frame and said displacement shaft are operatively associated with each other by a steel ball engaged in said V-shaped grooves.

12. An automatic polishing apparatus as claimed in claim 11, wherein said polishing machine further includes reciprocation means adapted to reciprocatingly move said polishing head body in directions of X and Y-axes at predetermined amplitudes during the polishing of said three-dimensional curved surfaces by said polishing tool.

13. An automatic polishing apparatus as claimed in claim 3, wherein said polishing apparatus further includes a rotary means adapted to cause rotation of one of said table and a polishing head relative to the other about the X and Y-axes, said polishing head being provided with said polishing head body and said reciprocation means, means are provided which are adapted to give a direction of rotation caused by said rotary motion means in accordance with whether the slope of the polishing portion of said three-dimensional curved surface is ascending or descending and said polishing portion is set left or right, and setting means adapted for setting beforehand a rotational displacement to be effected by said rotary motion means.

14. A polishing apparatus for polishing a three-dimensional curved surface of a workpiece, comprising:
a profiling device including a curved tracer for tracing a given line which has been drawn in a drawing and represents a two-dimensional plan view of the curved surface of said workpiece defined by X and Y-axes thereof, and detecting means for detecting the displacement of said tracer along said given lines so as to generate a detection signal representative of a displacement of said tracer in directions of said X and Y-axes; and
a polishing machine including a table for holding thereon a workpiece, a polishing head body having a polishing tool and a drive means for driving said tool to perform a polishing movement, feeding means for causing one of said table and said polishing head body to move with respect to the other in directions of the X and Y-axes of said workpiece in accordance with a detection signal of said detecting means, pressing means for causing one of said table and said polishing tool to move with respect to the other in the direction of a Z-axis of the workpiece so that said polishing tool is placed in pressure contact with a curved surface of said workpiece, a pressure detector for detecting whether or not a pressure exerted by said polishing tool to said workpiece is within a predetermined range, and polishing control means for controlling said pressing means in response to a result of said pressure detector so as to maintain said pressure within said predetermined range, whereby a profile polishing of said workpiece may be controlled by merely giving a profile of the three-dimensional curved surface in a form of a given line and the pressure of said polishing tool and said workpiece can be maintained substantially constant.

15. An automatic polishing apparatus according to claim 14, wherein said polishing tool further includes a non-woven fabric formed by irregularly arranging fibrous materials and fixing them to form a body having a resiliency, and a shaft body fixed to said non-woven fabric.

* * * * *